R. GOLDSTEIN.
PHOTOGRAPHIC CAMERA.
APPLICATION FILED JULY 30, 1909.
973,272.
Patented Oct. 18, 1910.
2 SHEETS—SHEET 1.
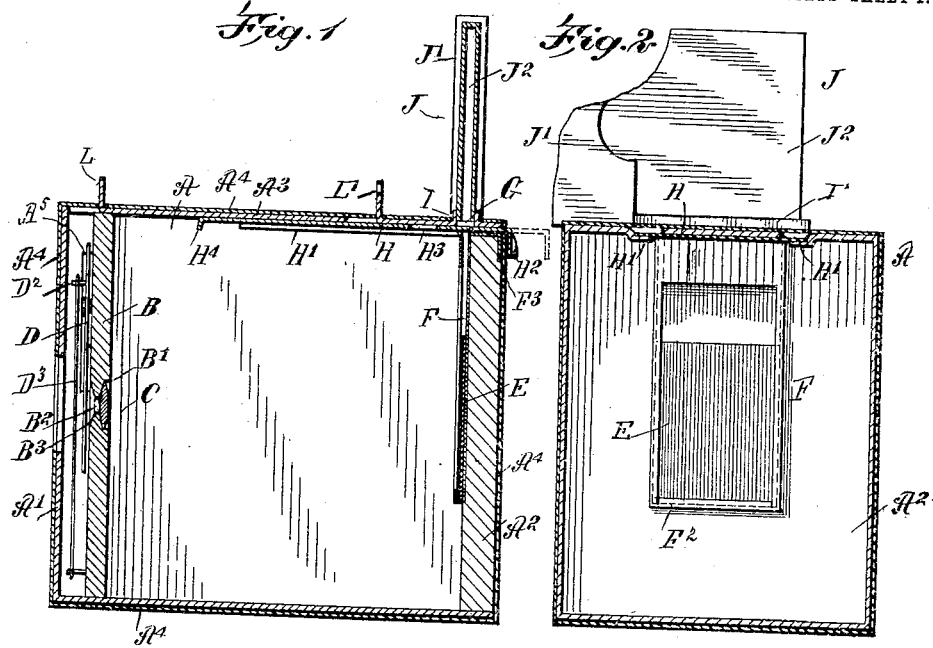
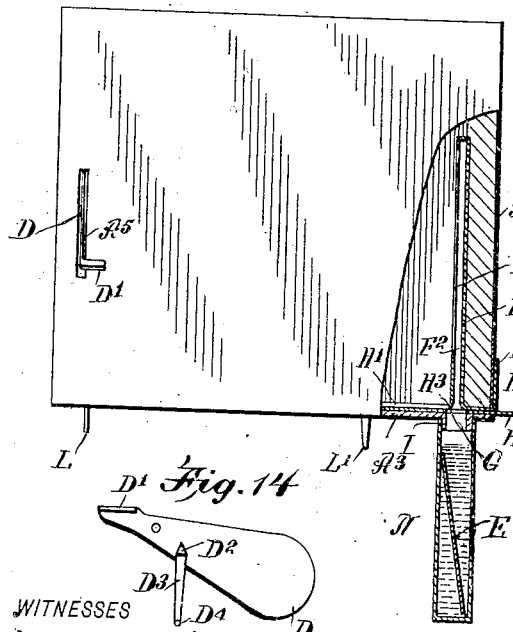
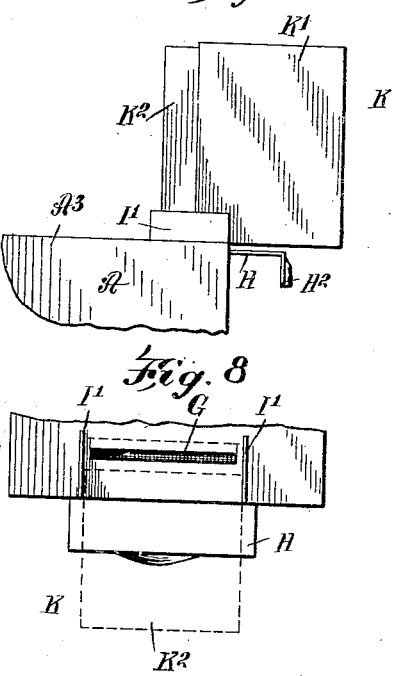
WITNESSES
INVENTOR
Robert Goldstein
BY
ATTORNEYS R. GOLDSTEIN.
PHOTOGRAPHIC CAMERA.
APPLICATION FILED JULY 30, 1909.
973,272.
Patented Oct. 18, 1910.
2 SHEETS—SHEET 2.
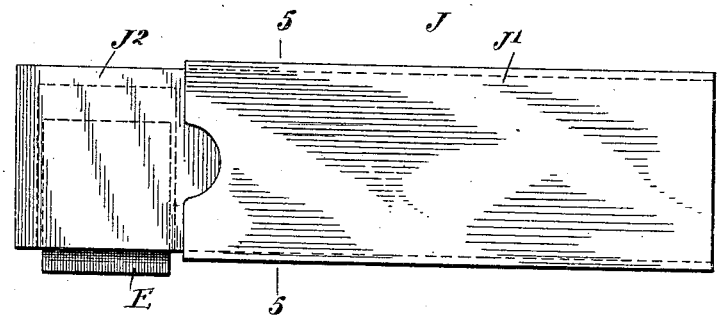
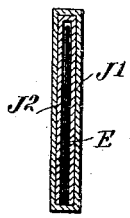
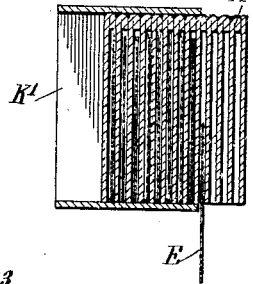
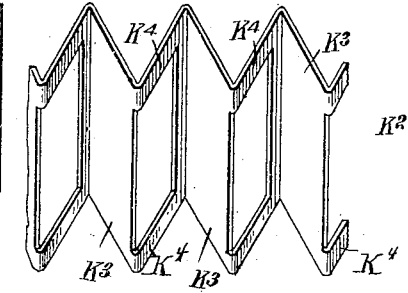
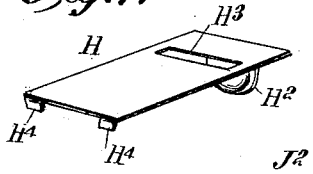
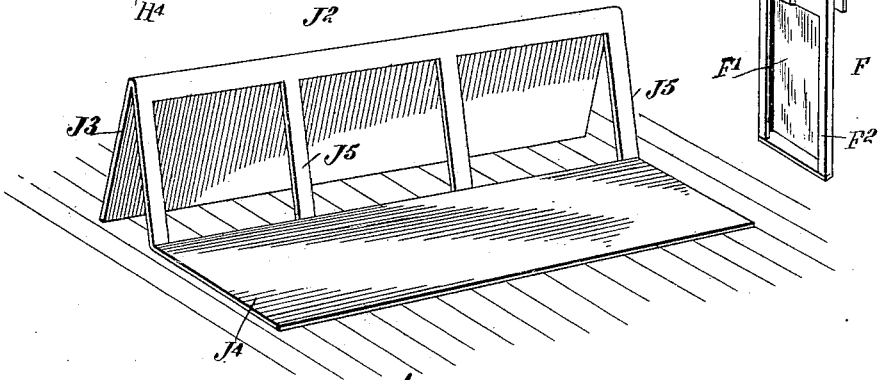
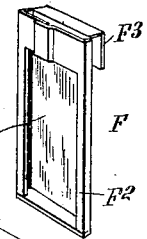
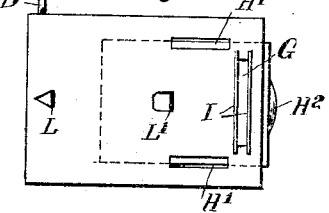
WITNESSES
INVENTOR
Robert Goldstein
BY
ATTORNEYS

UNITED STATES PATENT OFFICE.

ROBERT GOLDSTEIN, OF NEW YORK, N. Y.

PHOTOGRAPHIC CAMERA.

973,272.

Specification of Letters Patent. Patented Oct. 18, 1910.

Application filed July 30, 1909. Serial No. 510,394.

*To all whom it may concern:*

Be it known that I, ROBERT GOLDSTEIN, a citizen of the United States, and a resident of the city of New York, borough of Manhattan, in the county and State of New York, have invented a new and Improved Photographic Camera, of which the following is a full, clear, and exact description.

The object of the invention is to provide a new and improved photographic camera, which is very simple in construction, extremely cheap to manufacture, and arranged to permit of conveniently placing a sensitive plate in position in the camera from a magazine, and to remove the exposed plate from the camera for developing the same.

For the purpose mentioned the camera casing is provided at the top with a slot extending between a guideway adapted to receive the magazine plate holder, to allow of dropping a sensitive plate through the slot into a rack arranged within the camera casing at the rear end thereof, the said slot being controlled by a slide.

A practical embodiment of the invention is represented in the accompanying drawings forming a part of this specification, in which similar characters of reference indicate corresponding parts in all the views.

Figure 1 is a longitudinal central section of the improved photographic camera, showing the magazine in position; Fig. 2 is a cross section of the same; Fig. 3 is a side elevation, partly in section, and showing the camera upside down for transferring the exposed sensitive plate to an acid tank for developing the plate, the said tank being shown in position on the guideway; Fig. 4 is a side elevation of the magazine, showing the holder partly drawn out of the shell for discharging one of the sensitive plates; Fig. 5 is a cross section of the same, on the line 5—5 of Fig. 4; Fig. 6 is a perspective view of the plate holder in extended position; Fig. 7 is a side elevation of a modified form of the improvement, showing the magazine in position; Fig. 8 is a plan view of the same, the magazine being shown in dotted lines; Fig. 9 is a sectional side elevation of the magazine for the camera shown in Figs. 7 and 8; Fig. 10 is a perspective view of the plate holder of the magazine of modified form shown in Fig. 9; Fig. 11 is a perspective view of the slide for controlling the admission of a sensitive plate; Fig. 12 is a reduced plan view of the casing, the covering being removed; Fig. 13 is a perspective view of the plate holding rack; and Fig. 14 is a face view of the shutter.

The camera casing A is provided with a transverse partition B a short distance from the front end $A'$ of the casing, and the said partition B is provided with the usual lens C controlled by a shutter D for directing the rays of light onto the sensitive plate E held in a rack F attached to the rear end $A^2$ of the casing, as plainly illustrated in Figs. 1, 2 and 3. The rack F registers at its upper end with a slot G formed in the top $A^3$ of the casing A, and the said slot G is opened and closed by a slide H mounted to slide in suitable bearings $H'$ arranged on the under side of the top $A^3$ of the casing A. The slide H extends to the outside of the casing at the rear end thereof, and the outer end of the slide is provided with a handle $H^2$ adapted to be taken hold of by the user of the camera, to move the slide H lengthwise in its bearings $H'$ with a view to open and close the slot G. The slide is provided with a slot $H^3$ adapted to register with the slot G and the rack F for the passage of a sensitive plate, as hereinafter more fully described.

On the top $A^3$ is arranged a guideway I formed of two parallel members between which extends the slot G, and the said guideway is adapted to receive the magazine J, containing sensitive plates E, for dropping one of the said plates through the slot G into the rack F for exposure in the camera, on actuating the shutter D in the usual manner.

The magazine J (see Figs. 4, 5 and 6) consists of a shell $J'$, open at one end and containing the plate holder $J^2$ having spaced chambers, each containing a sensitive plate E, the chambers being open at the bottom so that when the holder $J^2$ is drawn out a distance corresponding to the width of a chamber, then the sensitive plate E contained in this drawn out chamber can drop out of the same and through the slot G into the rack F, as previously explained.

The holder $J^2$ is preferably formed from a single sheet of paper, or other suitable material, the sheet being creased transversely to allow of folding the sheet with a view to forming the sides $J^3$ and $J^4$ and an intermediate cut-out portion $J^5$ for forming the chambers containing the plates E, as will be readily understood by reference to Fig. 6. As shown in Figs. 1, 2 and 3, the guideway I is arranged transversely and the holder J² has its chambers arranged one alongside the other, so that the magazine is used transversely on the camera, as plainly indicated in Figs. 1 and 2. As shown in Figs. 7 and 8, the guideway I' is arranged longitudinally on the top A³ of the camera, but between the members of the guideway extends the slot G.

A magazine K, for use between the members of the guideway I', consists of a shell K' and a holder K² having the chambers arranged one in front of the other, as plainly indicated in Fig. 9, each chamber being open at the bottom, so that when a chamber is moved into register with the slot G, then a sensitive plate E can drop through the slot G into the rack F at the time the slide H is in open position. The holder K² is also made from a single sheet of paper or like material, creased to allow of folding the sheet as indicated in Fig. 10, alternate sections K³ being solid and the other sections being cut out for forming chambers K⁴ for the reception of the plates E. Thus, by the arrangement described, the plate holders J² or K² can be cheaply manufactured, and the said holders can be readily filled in a dark room and then slipped into the shell J' or K', to be drawn out of the same at the time a plate is to be transferred to the rack F for exposure in the camera casing, as previously explained.

On the top A³ of the camera is arranged a sighting device consisting of the point L and an apertured post L' for sighting the object to be photographed, thus insuring a proper registering of the image on the sensitive plate E held in the rack F within the casing A.

The body of the casing A, except the rear end A², is preferably made from a single piece of sheet metal, while the end A² and the partition B are preferably made of wood to cheapen the manufacture of the camera. The casing body has a covering A⁴ of paper or other suitable material, to render the camera light-tight. The guideways I are struck up from the top A³ of the metallic casing body to form the slot G, and the point L and the post L' of the focusing or sighting device are likewise struck up from the top A³ of the metallic casing body, the apertures produced in the top A³ by the struck up point L and the post L' being covered up by the covering A⁴, as plainly indicated in Fig. 1.

The partition B is provided at its inner face with a depression or seat B' for the lens C, the seat leading to a reduced stop aperture B² having a flaring mouth B³, as plainly indicated in Fig. 1. The shutter D is formed of a single piece of sheet metal and extends through a slot A⁵ in one side of the casing, and the piece of sheet metal is bent at the outer end to form an angular handle D'. The shutter is also provided with a struck up lug D² (see Fig. 14) for engagement by a rubber band D³ also engaging a pin D⁴ driven into the partition B. The rubber band D³ serves as a spring to normally hold the shutter D in a closed position—that is, to cover the mouth B³ of the stop aperture B². When the handle D' is pressed by the operator, the shutter D swings open against the tension of the rubber band D³ and when the operator releases the handle D', the shutter swings shut, the closing movement of the shutter being limited by the handle D' abutting against the side of the casing A (see Fig. 3).

The rack F is made from a single piece of sheet metal (see Fig. 13) bent to form a back F', guideways F² at the front for holding the plate E in position, and a hook F³ at the top for engagement with the upper end of the rear end A² to hold the rack F in position without further fastening devices. The slide H is formed from a single piece of sheet metal (see Fig. 11) bent to form the handle H² and cut out to form the slot H³ previously referred to. The guideways H' for the slide H are struck up from the top A³ of the casing body (see Figs. 2 and 12) and the front end of the slide H is provided at its sides with depending stop lugs H⁴ adapted to abut against the front ends of the guideways H' to limit the outward sliding movement of the slide H, the latter in the extreme outer position having its slot H³ in register with the slot G and the upper end of the rack F. An acid tank N is used in connection with the camera for receiving an exposed plate E for the camera (see Fig. 3), for developing the said plate. The tank N is also made of a single piece of sheet metal and its open mouth is adapted to fit onto the guideway I. From the foregoing it will be seen that the camera can be cheaply manufactured.

The camera is used as follows: When the rack F is empty and it is desired to place a sensitive plate E in position in the rack from the magazine J, then the latter is placed in position on the guideway I, as indicated in Figs. 1 and 2, and then the slide H is pulled outward into open position to allow the sensitive plate E to drop from the corresponding chamber in the holder J² through the slot G and the slot H³ in the slide, down into the rack F, as indicated in Fig. 1. When this has been done, then the operator pushes the slide H inward to close the slot G, after which the holder is removed from the guideway I. The object to be photographed can now be sighted through the sighting device, and then the operator presses the self-closing shutter D to swing the latter open for making the desired exposure. When this has been done, the camera casing is turned upside down and then an acid tank N is fitted with its open mouth onto the guideway I, as plainly indicated in Fig. 3, after which the slide H is pulled outward to allow the exposed plate E' to drop out of the rack F through the openings H³ and G into the tank N containing acid for developing the sensitive plate. As soon as the plate E is transferred, the tank N is removed, and then the camera casing is returned to normal position to allow of recharging the same with a sensitive plate from the holder J.

The camera having the guideways I' and the magazine K, is used in the same manner as the one just described, the only difference being that the holder K² is shifted lengthwise of the camera for dropping a plate into the rack F instead of transversely, as is the case when using the holder J².

The photographic camera shown and described is very simple and durable in construction, can be very cheaply manufactured, and is not liable to get easily out of order.

The camera can be readily manipulated for making the desired exposure, for charging the camera and for developing the exposed plates.

Having thus described my invention, I claim as new and desire to secure by Letters Patent:

1. A photographic camera, comprising a camera casing provided at the top with a slot, a guideway on the top and between which extends the said slot, the guideway being adapted to receive a magazine plate holder, a rack within the said casing and in register with the said slot to allow a sensitive plate to drop from the magazine plate holder by way of the said slot into the said rack, and a slide mounted on the said camera casing for opening and closing the said slot.

2. A photographic camera, comprising a camera casing having a slot in its top at the rear end, a guideway on the said top and between which extends the said slot, a slide controlling the said guideway, a rack on the inner face of the rear end of the camera casing and in register with the said slot, a magazine having a shell open at one end, and a plate holder slidable in the said shell and having spaced separate chambers each for containing a sensitive plate, the said holder fitting the said guideway and each chamber being open at the bottom to register with the said slot for dropping a sensitive plate from the holder into the said rack.

3. A photographic camera having a sheet metal body provided at the top with outwardly struck up guideways forming a slot between them for the passage of the photographic plate from a magazine adapted to be held by said guideways.

4. A photographic camera having a sheet metal body provided at the under side of its top with inwardly struck up guideways, the said top also having a slot for the passage of the plate, and a metal slide movable in the said guideways and having a slot adapted to register with the said top slot, the said slide having an integral angular handle at the rear end and integral stop lugs at the front end, the stop lugs being adapted to abut against the said guideways.

5. A photographic camera having a body and a rack for receiving a photographic plate, the rack being formed from a single piece of sheet metal bent to form a back, front retaining flanges for holding the plate in place, and a hook at the upper end of the said back to hook onto the rear end of the casing.

6. A photographic camera provided with a sheet metal casing having struck up guideways forming a slot between them, and an acid tank having a mouth adapted to fit the said guideways.

7. A photographic camera having a sheet metal body provided with guideways on its upper face, guideways on its inner face, an apertured slide in the last named guideways, and sighting posts on its upper face, the said guideways and sighting posts being struck up from the body and the first named guideways forming a slot and a covering for said body.

In testimony whereof I have signed my name to this specification in the presence of two subscribing witnesses.

ROBERT GOLDSTEIN.

Witnesses:
 THEO. G. HOSTER,
 PHILIP D. ROLLHAUS.